March 6, 1934. H. BLEIBTREU ET AL 1,950,020
MOISTURE AND DUST ELIMINATOR FOR GAS WASHERS
Filed Dec. 18, 1931
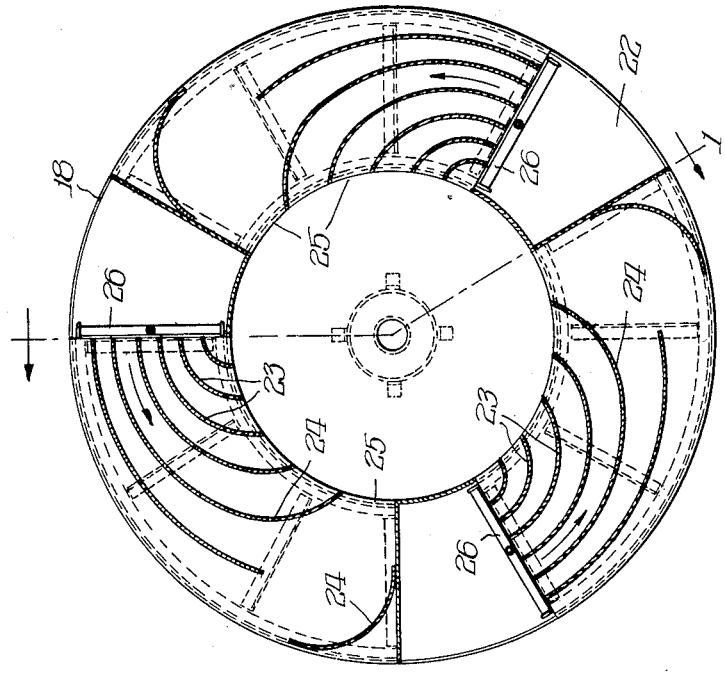
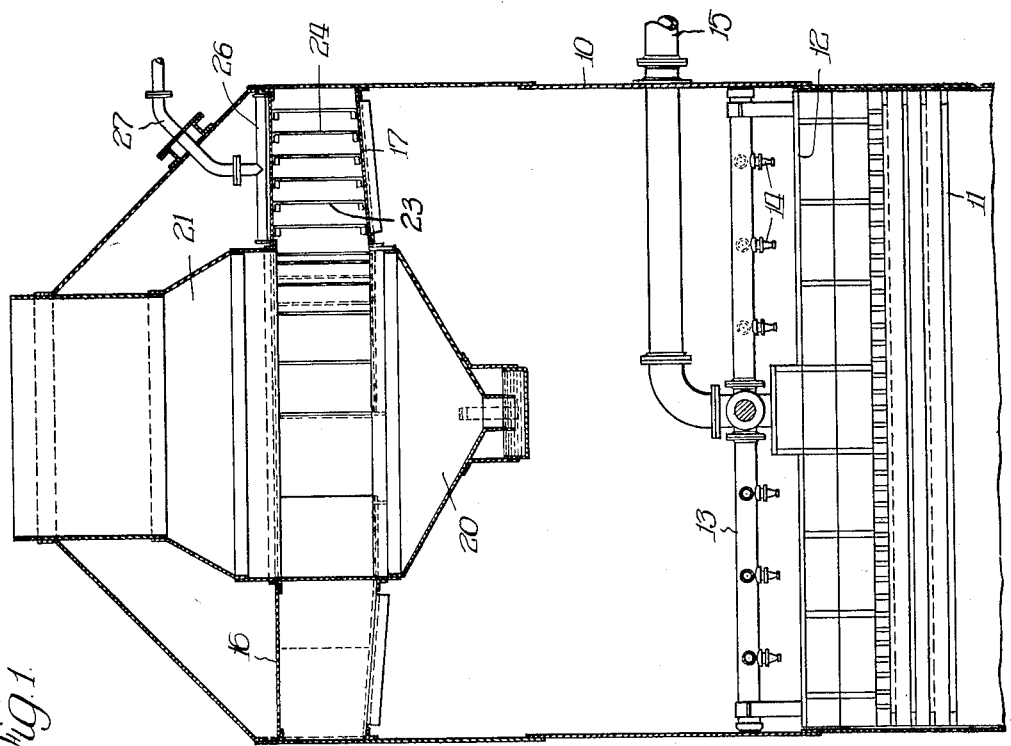
Inventors:
Herman Bleibtreu,
Alfred J. Ebner, Patented Mar. 6, 1934

1,950,020

UNITED STATES PATENT OFFICE 1,950,020

MOISTURE AND DUST ELIMINATOR FOR GAS WASHERS

Hermann Bleibtreu and Alfred J. Ebner, Chicago, Ill., assignors to Freyn Engineering Company, Chicago, Ill., a corporation of Maine Application December 18, 1931, Serial No. 581,849

5 Claims. (Cl. 183—21)

The invention relates to gas cleaning apparatus and has reference in particular to auxiliary apparatus for association with tower washers generally employed for cleaning blast furnace gas.

An object of the invention is to provide apparatus designed to receive the gas from a tower washer or directly from the furnace or stack and to cause a change in the direction of flow of the gas, resulting in subjecting the gas to a water spray and giving the same a whirling motion, thus utilizing centrifugal force in addition to the action of the water for separating the dust particles and other solid impurities from the gas.

A further object is to provide apparatus which will divide the gas stream delivered thereto into a plurality of smaller streams by means of a number of passageways, each being designed to change its direction of flow and by centrifugal force cause the solid particles carried along in the streams to contact the walls of the passageways. The whirling action of the gas stream and the increased surface presented by the passages for contact with the gas insures that the smaller and lighter particles as well as the heavier particles will be caused to contact the surfaces and separate from the streams.

A further feature in the present construction of gas cleaning apparatus is the particular curvature given to the walls forming the passages and providing the contacting surfaces, the same giving the gas a centrifugal action and also a baffling effect to cause a sudden decrease in the velocity of the gas before it is finally discharged. As the surfaces are continuously wetted by the water spray the gas is brought into intimate contact therewith through the present construction of apparatus, securing a high efficiency with minimum water requirements.

Another object of the invention is the provision of rubber partitions for forming the passages through which the gases are directed. In the preferred embodiment disclosed the inner walls of the apparatus are also lined with rubber so that the device resists the corrosive effect of the gases in addition to efficiently withstanding the abrasion due to the action of the solid particles in the gas.

All of the above are important features and are correlated in the broad aim of the invention to secure greater efficiency, to increase the usefulness of the device and to secure a structure which will fulfill all requirements of service and manufacture.

With these and various other objects in view, the invention may consist of certain novel features of construction and operation as will be more fully described and particularly pointed out in the specification, drawing and claims appended hereto.

In the drawing, which illustrates an embodiment of the device and wherein like reference characters are used to designate like parts—

Figure 1 is a vertical, sectional view showing the interior construction of the auxiliary gas cleaning apparatus and the manner of associating the same with a tower washer, and Figure 2 is a horizontal, sectional view taken through the auxiliary washer and showing the arrangement of the parts.

The present device may be associated with a tower washer indicated in its entirety by 10 and consisting essentially of a cylinder supported endwise upon a suitable foundation and having an opening at its bottom, not shown, for admitting blast furnace gas thereto. The gas travels upwardly through the tower and is given a baffling effect by the location in the tower of a plurality of spaced hurdles or baffles 11. The gas is caused to contact the baffles and to flow around them in its travel upwardly through the tower.

Suitably supported at the top of the tower above the baffles 11 by supporting structure 12 is a number of water spray pipes 13 provided with nozzles 14. The main water supply pipe 15 supplies the individual pipes 13, and in operation the gas working its way upwardly past the elements 11 is subjected to a washing effect by the water which works its way downwardly over the baffles. The above constitutes the essentials of the well known tower washer and is described in order that the operation of the present apparatus may be better understood.

Suitably secured to the walls of the tower at a point above the water spray pipes 13 is a drum formed of top and bottom walls 16 and 17, respectively, connected by cylindrical outer walls 18. Secured to the bottom wall centrally of the drum is a water drain 20, while the upper wall is provided with a central outlet 21, which extends to a point outside the tower and forms a common outlet for the tower and drum. The inlets 22 for admitting the gases to the drum after they have passed through the tower washer are provided in the bottom wall 17 and are preferably equi-distant around the outer portion of the wall.

The inlet communicates with a plurality of passages formed by partitions 23 and 24 suitably secured to and extending vertically from the top to the bottom wall of the drum. The partitions designated 23 are formed of arcuate shape and extend from a point adjacent the inlets 22 to the outlets 25 leading to the main outlet 21 of the drum and tower. Partitions 24 are also of arcuate shape, being somewhat longer than the partitions 23 and by reason of their length having an abrupt curvature adjacent the outlet 25. Located in advance of the passages formed by the partitions is a header 26, one being positioned in each inlet and above the top wall of the drum and having connection to a water supply pipe 27. Each header is provided with a plurality of nozzles extending downwardly and which thus function to locate water sprays in advance of the passages, the water being collected in the central drain 20 and being suitably conducted from the apparatus.

A feature of the invention is the provision of partitions 23 and 24 having the arcuate shape disclosed and which are formed of rubber. The inner walls of the drum are also lined with rubber so that the greatest resistance to corrosion and to the abrasive effects of the solid particles carried along in the gas streams is presented. The particular curvature given to the parts 23 gives a whirling motion to the gases passing therethrough and in changing their direction of flow the gases are caused to contact the outer wall of each passage. The formation of the partitions 24 is such as to change the direction of flow of the gas streams and to also impart a baffling effect to the gases, the latter being accomplished by the abrupt curvature given to the terminal portions of the partitions. The gases from the tower washer enter the inlets 22 and are conducted past the water sprays caused by the headers 26 where the same are divided into a plurality of streams by the partitions described. The curvature of the partitions imparts a centrifugal force upon the solid particles carried in the stream, causing the particles to contact the walls and particularly the outer walls defining the passage. The surfaces are maintained in a wet condition by reason of the gas having first passed through the water sprays and the solid particles are caused to adhere to the surfaces by the moisture and to thus separate from the gas streams. This elimination of the solid particles and consequent cleansing of the gases is increased by the baffling effect of the gases when they contact the terminal portions of the partitions 24. The decrease in their velocity causes the solid particles to drop by gravity so that the gases when delivered to the outlet 21 have by the combined action of the water spray and the partitions been thoroughly cleaned. The breaking up of the gases received from the tower washer into a plurality of individual streams enables the gases to be more intimately brought into contact with the wet surfaces. The centrifugal action upon the solid particles forces them into contact with the outer walls defining the passages where they drop to the bottom of the drum or are caught by the particles of moisture adhering to the surfaces. The effect is that the particles eventually unite with the water forming a slurry which is conducted by the drain 20 to settling tanks or the like.

The present apparatus is preferably associated with tower gas washers since these washers give the gas a preliminary cleaning and in most installations it has heretofore been necessary to conduct the gas to another tower or to a secondary washer before the gases were in a condition for use. With the present construction the gases enter directly from the tower washer and are subjected to a second cleansing operation, whereupon they will leave the same, having a dust and moisture content substantially lower than would otherwise be the case, and sufficiently low to suit all requirements excepting those of a more exacting nature which can be secured through mechanical fans or disintegrators.

It is to be understood that we do not wish to be limited by the exact embodiment of the device shown, which is merely by way of illustration and not limitation, as various and other forms of the device will of course be apparent to those skilled in the art without departing from the spirit of the invention or the scope of the claims.

We claim:

1. In a gas washer, in combination, a housing having a number of bottom inlets and a central outlet, and having passageways for directing the gases from the inlets to the outlet, a water spray located in advance of the passageways adjacent the inlets, and means changing the direction of flow of the gases during their travel from the inlets to the outlet and imparting a centrifugal force upon the solid particles carried along in the gases.

2. In a gas washer, in combination, a housing having a number of bottom inlets and a central outlet, and having passageways for directing the gases from the inlets to the outlet, a water spray located in advance of the passageways adjacent the inlets, and a plurality of partitions in each passageway dividing the gases delivered thereto into a number of separate streams, said partitions providing contacting surfaces for the solid particles carried along in the gases.

3. In a gas washer, in combination, a housing having a number of bottom inlets and a central outlet, passageways for directing the gases from the inlets to the outlet, a water spray located in advance of the passageways adjacent the inlets, and a number of arcuate partitions in each passageway extending from the inlet to the outlet, said partitions changing the direction of flow of the gases and imparting a centrifugal force upon the solid particles carried along in the gases.

4. In an auxiliary gas washer for association with a tower washer, a circular housing having a number of inlets formed in its bottom wall and a central outlet, said inlets communicating with the tower washer, passages connecting the respective inlets with the single outlet, a water spray located in advance of the passages and adjacent the inlets, said passages being arcuate and effecting a change in the direction of flow of the gases travelling therethrough, whereby the solid particles in the gas stream are caused to contact the walls of the passages and separate from the stream.

5. In a gas washer, in combination, a circular housing having a number of inlets formed in its bottom wall and a central outlet, passages connecting the respective inlets with the single outlet, a water spray located in advance of the passages and adjacent the inlets, said passages being arcuate for the greater portion of their length and terminating in an abrupt curvature adjacent the outlet, whereby the change in the direction of flow and decrease in the velocity of the gases travelling therethrough separates the solid particles therefrom.

HERMANN BLEIBTREU.
ALFRED J. EBNER.